United States Patent Office 3,167,201
Patented Jan. 26, 1965

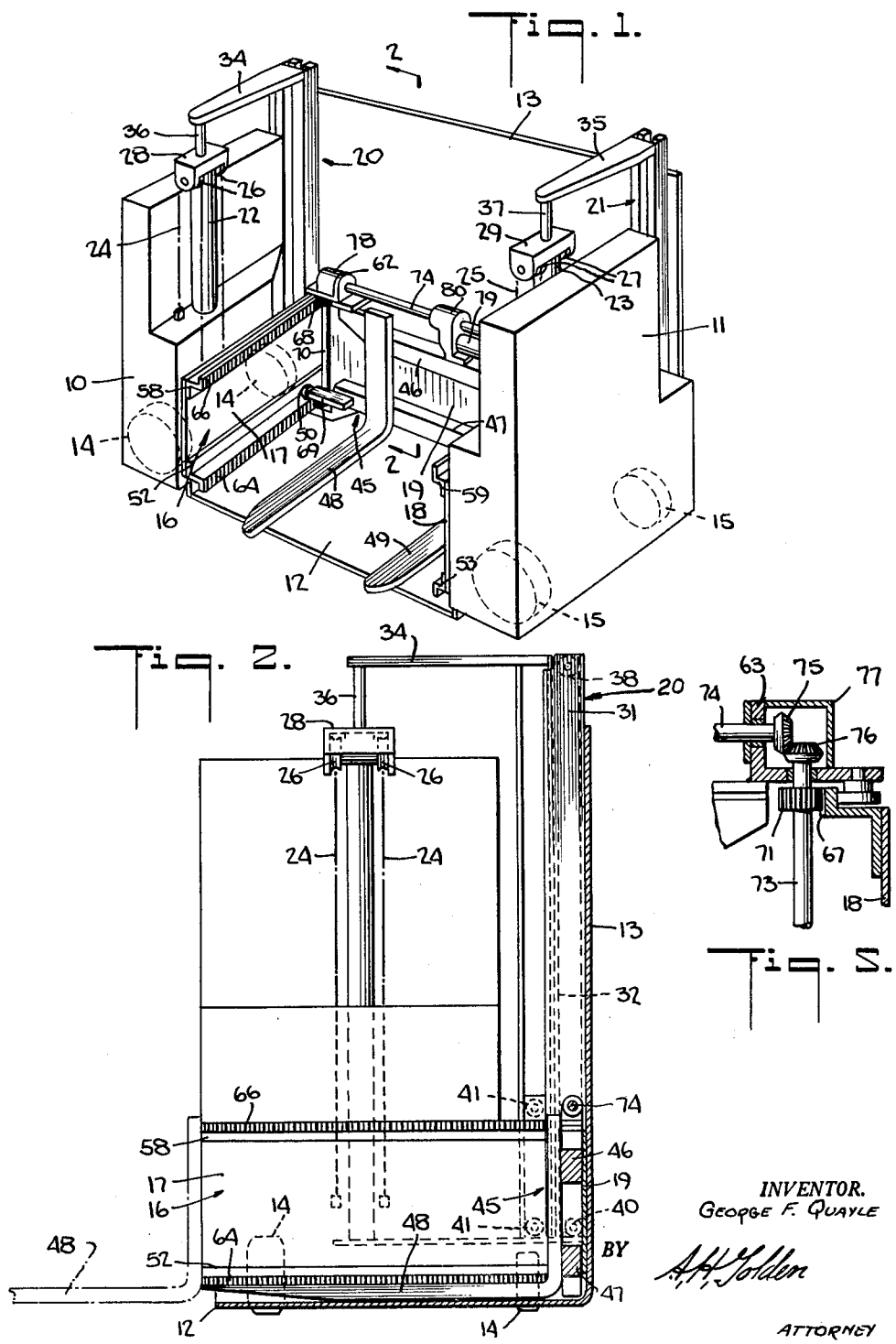

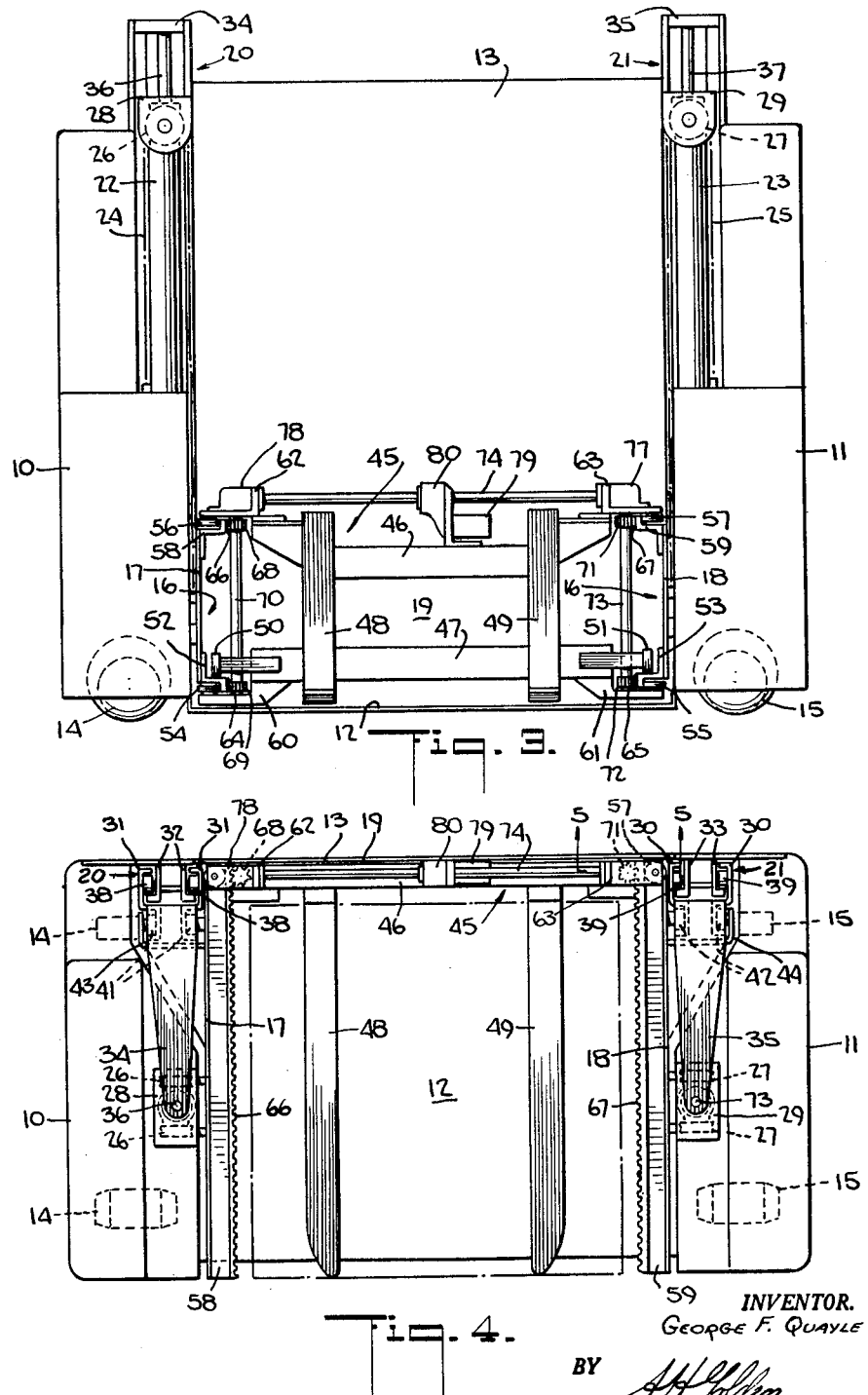

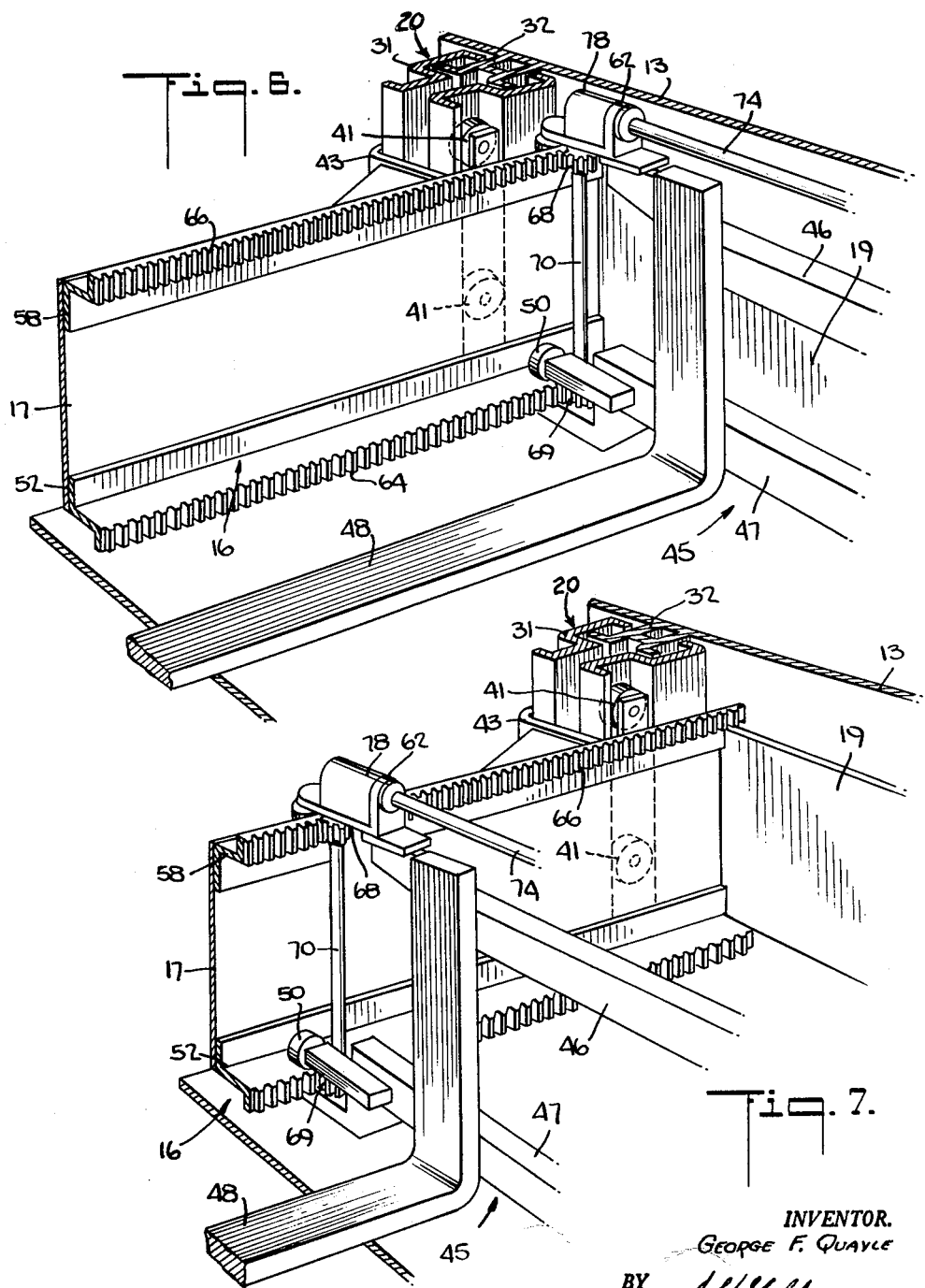

3,167,201
LIFT TRUCK WITH LATERALLY MOVABLE LOAD SUPPORT MEMBERS THAT IS MOUNTED FOR VERTICAL MOVEMENT IN GUIDE MEANS WHICH SERVES AS A COUNTER-WEIGHT FOR THE LOAD
George F. Quayle, Philadelphia, Pa., assignor, by mesne assignments, to Yale & Towne, Inc., New York, N.Y., a company of Ohio
Filed Oct. 11, 1960, Ser. No. 61,924
3 Claims. (Cl. 214—730)

This invention relates to a side lift truck, i.e. a lift truck which is adapted to lift a load positioned along the side of the truck and to move the load into the transverse confines of the truck to minimize the over-all width of the truck and load.

Trucks of this type are useful in handling articles which are stacked along relatively narrow aisles, as a load can be picked up or deposited from the side of the truck without turning the truck.

The present invention is directed particularly to a side lift truck of the type incorporating a load-lifting mechanism having vertical uprights and a load carriage mounted for vertical movement on the uprights. The purpose of the invention is to provide a side lift truck of this type, which is of simpler construction, is more stable, and may accommodate wider loads within the transverse confines than present trucks of this general construction.

To this end, the uprights and lifting rams of the truck of the invention are mounted on each side of the load carriage rather than behind the load carriage, as in trucks as presently constructed. Thus, in the truck of the invention the uprights and lifting rams provide no obstruction to the load carriage transversely of the truck, and the load carriage may be substantially the width of the truck to accommodate wider loads than trucks of present construction in which the uprights and rams are positioned behind the load carriage.

In addition, the load carriage of the truck of the invention is provided with a separate load-supporting member which is movable vertically with the load carriage and is extendable from the side of the truck to pick up or deposit a load along the side of the truck. It is, therefore, not necessary to mount the uprights, lifting rams, and load carriage of the truck of the invention for movement transversely of the truck to permit the load carriage to be extended from the side of the truck to pick up a load as in present side lift trucks, and heavy, expensive structure for supporting and moving the uprights, lifting rams and load carriage transversely of the truck is not required with resulting simplification of the construction of the truck. Further, because the heavy uprights do not have to move transversely of the truck, they may be fixed to the side of the truck opposite that from which the load-supporting member extends so as to provide maximum counter-balancing effect to a load positioned on the load-supporting member and thereby improve the stability of the truck.

As a feature of the invention, a novel arrangement is provided for mounting and extending the load-supporting member relatively to the load carriage which prevents cocking and binding between the load-supporting member and the load carriage during extension and retraction of the load-supporting member. In the preferred form, this arrangement includes upper and lower pinions at each side of the load-supporting member which are inter-connected for simultaneous rotation, and when rotated extend or retract the load-supporting member relatively to the load carriage and accept the load stresses between the load-supporting member and the load carriage in all positions of the load-supporting member.

The invention and its advantages having been broadly described, a more detailed description of one embodiment of the invention is given hereafter by reference to the accompanying drawings, wherein:

FIG. 1 is a perspective view of a truck constructed in accordance with the present invention, FIG. 2 is a sectional view taken along the line 2—2 of FIG. 1, FIG. 3 is a side view of the truck, FIG. 4 is a top plan view of the truck.

FIG. 5 is a sectional view taken along the line 5—5 of FIG. 4,

FIG. 6 is a partial sectional perspective view showing the load-supporting member in retracted position, and FIG. 7 is a view similar to FIG. 6 but showing the load-supporting member extended relative to the load carriage.

Referring to the drawings, and in particular to FIG. 1, the truck includes fore and aft compartments 10 and 11 which are rigidly connected together in spaced relationship by a bottom plate 12 and a side plate 13 to form an integral truck body. The side of the spaced between the compartments 10 and 11 opposite the side plate 13 is left open to permit the extension of a load-supporting member from the side of the truck, as will be described in detail hereafter.

The compartments 10 and 11 may be of any desired construction for supporting front and rear wheels 14 and 15 on which the truck is adapted to move. The compartments 10 and 11 also serve to carry the drive motors, batteries, fluid pump and other equipment necessary for operation of the truck, but as these details form no part of the present invention they have not been illustrated in the drawings.

The particular truck illustrated in the drawings is intended for remote control operation, and accordingly does not include an operator's platform or manual controls. It will be appreciated, however, that the invention is equally applicable to trucks which do include an operator's platform and manual controls, so that they may be operated manually by an operator riding on the truck.

A generally U-shaped load carriage 16 formed by side plates 17 and 18 and a backplate 19 is disposed in the space between compartments 10 and 11, with the open side of the carriage opposite the backplate 19 opening in the same direction as the open side of the space between the compartments 10 and 11. The load carriage 16 is guided for vertical movement on upright assemblies 20 and 21, secured respectively to the compartments 10 and 11 on opposite sides of the load carriage, and the load carriage 16 is adapted to be lifted by lift rams 22 and 23 through chains 24 and 25 which are trained over sprockets 26 and 27 carried by crossheads 28 and 29 of the rams 22 and 23. The chains 24 and 25 are secured at one end to the compartments 10 and 11 and at the other end to the load carriage 16 so that the load carriage 16 is moved at double the speed of the rams as the crossheads 28 and 29 are raised or lowered by operation of the rams.

The rams 22 and 23 are secured respectively to the compartments 10 and 11 on each side of the load carriage 16 centrally of the truck. Because both the upright assemblies 20 and 21 and the lift rams 22 and 23 are mounted on the sides of the load carriage 16, rather than behind the load carriage, the load carriage may be substantially the width of the truck, as best shown in FIGS. 2 and 4, so that a load substantially the width of the truck may be accommodated on the load carriage. By mounting the rams 22 and 23 centrally of the truck, the load carriage 16, and any load thereon, is supported by chains 24 and 25 nearer the center of gravity of the load than would be the case if the rams were positioned at one side of the truck, thereby minimizing the bending moment applied to the uprights by a load carried by the load carriage 16.

The upright assemblies 20 and 21 include movable, or secondary, uprights 30 and 31 which are adapted to be extended vertically relatively to stationary, or primary, uprights 32 and 33 by the rams 22 and 23 when the crossheads 28 and 29 engage arms 34 and 35 which are secured, as best shown in FIG. 4, to the top of the secondary uprights 30 and 31. Upward movement of the crossheads 28 and 29 before they engage the arms 34 and 35 results in free lift of the load carriage 16, i.e. elevation of the load carriage without elevation of the secondary uprights. During such movement of the crossheads 28 and 29, the ram pistons are guided by rods 36 and 37 which are secured to the arms 34 and 35 and extend into the ends of the pistons. This particular arrangement for guiding the rams is disclosed in U.S. Patent No. 2,791,292 and reference is made thereto for a more detailed description of the construction and operation of the guiding arrangement.

As best shown in FIG. 4, each of the secondary uprights 30 and 31 is formed of two members of S-shaped cross section, each providing two channels. The secondary uprights 30 and 31 are conveniently mounted for vertical movement on the primary uprights by rollers 38 and 39 secured to each side of the upper ends of the primary uprights 32 and 33 and extending into one channel of each member of the secondary uprights 30 and 31, as shown in FIG. 4, and by rollers 40 secured to the lower ends of each member of the secondary uprights 30 and 31 and extending into the channels on each side of the primary uprights 32 and 33. One of the rollers 40 is shown in FIG. 2.

As best shown in FIGS. 2, 4 and 6, the load carriage 16 is conveniently mounted for vertical movement on the secondary uprights 30 and 31 by means of rollers 41 and 42 which are secured respectively to side plates 17 and 18 of the load carriage 16 and extend into channels of each member of the secondary uprights 30 and 31. As shown in FIG. 4, the outermost of the rollers 41 and 42 are supported by brackets 43 and 44 secured respectively to side plates 17 and 18, and the compartments 10 and 11 are recessed adjacent one side of the truck to accommodate the brackets when the load carriage 16 is in lowered position.

In accordance with the invention, a load-supporting member 45, formed by upper and lower cross bars 46 and 47 and forks 48 and 49 secured at their rear ends to the bars 46 and 47, is mounted on the load carriage 16 for vertical movement with the load carriage and extending movement relatively to the load carriage so that the forks may be extending from the side of the truck to pick up a load and then be retracted to bring the load within the transverse confines of the truck. This arrangement eliminates the necessity of mounting the heavy upright assemblies for transverse movement so that the load carriage may be extended from the side of the truck to pick up the load directly as in prior trucks of this general type. The upright assemblies 20 and 21 can, therefore, be fixed to one side of the truck, as shown in the drawings, so that the weight thereof provides maximum counter-balancing effect to a load supported by the forks 48 and 49 of the load-supporting member 45.

As best shown in FIG. 3, the load-supporting member 45 is supported on the load carriage 16 by rollers 50 and 51 which are secured to opposite ends of the lower cross bar 47 and roll on the upper horizontal surface of lower Z-shaped horizontal bars 52 and 53 secured respectively to the inner opposed faces on the side plates 17 and 18 of the load carriage 16. As also shown in FIGS. 3 and 4, the load-supporting member 45 is guided by upper and lower rollers 54, 55, 56 and 57 which engage respectively the inner surfaces of vertical flanges of the lower Z-shaped bars 52 and 53 and the inner surfaces of vertical flanges of upper Z-shaped bars 58 and 59, which are also secured to the inner opposed faces of the side plates 17 and 18 of the load carriage 16. Rollers 54 and 55 are carried by brackets 60 and 61 secured to opposite ends of a lower cross bar 47, while rollers 56 and 57 are secured to brackets 62 and 63 secured to the opposite ends of the upper cross bars 46.

The outer face of the vertical flange of each of the Z-shaped bars 52, 53, 58 and 59 is provided respectively with a rack 64, 65, 66 and 67. Racks 66 and 64 are engaged by and mesh with upper and lower pinions 68 and 69 secured to a vertical shaft 70 which is suitably journalled at each end for rotation in the brackets 60 and 62. Racks 67 and 65 are similarly engaged by and mesh with upper and lower pinions 71 and 72 secured to a vertical shaft 73 which is suitably journalled at each end for rotation in the brackets 63 and 61.

Each of the shafts 70 and 73 are connected together for simultaneous rotation by a horizontal shaft 74. As best shown in FIG. 5, one end of the shaft 74 is connected to the upper end of the shaft 73 by meshing bevel gears 75 and 76 secured respectively to the ends of shaft 74 and 73 and enclosed in a housing 77 secured to bracket 63. The other end of the shaft 74 is similarly connected to the other end of the shaft 70 by bevel gears (not shown) enclosed in a housing 78 secured to the bracket 62. Each of the pinions 68, 69, 71 and 72 are of the same size, and as they are connected together for simultaneous rotation at the same speed, it will be appreciated that the top, bottom and each side of the load-supporting member 45 must move at the same speed. Accordingly, there can be no cocking or binding of the load-supporting member by loads supported on the forks 48 and 49.

A motor 79 is secured to the upper cross bar 46 and is connected to the shaft 74 by a suitable transmission 80 so that operation of the motor 79 serves to rotate the shaft 74 and, therefore, shafts 70 and 73 and the pinions 68, 69, 71 and 72. Being in meshing engagement with racks 68, 66, 67 and 65, rotation of the pinions 68, 69, 71 and 72 by the motor 79 serves to extend or retract the forks 48 and 49 from the side of the truck, depending on the direction in which the pinions are rotated. The forks are shown in retracted position in FIG. 6 and in extended position in FIG. 7. As can be best seen from FIGS. 2 and 4, this manner of mounting and extending of the load handling member allows the forks 48 and 49 to have a length equal to substantially the full depth of the load carriage 16 and allows the full length of the forks to be extended from the side of the truck so that a load of substantially the width of the truck may be handled by the forks.

In utilizing the truck to pick up a pallet-supported load positioned along a narrow aisle, the truck is moved along the aisle to a position alongside of the load. The load carriage 16 is then elevated by operation of the lifting rams 22 and 23 as necessary to bring the forks 48 and 49 into vertical alignment with the pallet of the load, and the motor 79 operated to extend the forks 48 and 49 from the side of the truck through the pallet. The rams 22 and 23 are then operated to raise the pallet slightly and the motor 79 operated to retract the forks 48 and 49 and the pallet-supported load to within the transverse confines of the truck. The load carriage 16 can then be lowered to improve the stability of the truck and the load transported by the truck to a desired location. The truck may be similarly utilized to deposit a pallet-supported load along the side of a narrow aisle.

From the preceding description, it can be seen that there is provided an improved construction for a side lift truck in which the uprights and lifting rams are mounted on each side of the load carriage, rather than behind the load carriage. Accordingly, the load carriage may be of substantially the full width of the truck. Further, the provision of a separate load-supporting member mounted on the load carriage for vertical movement with the load carriage and for extending movement from the side of the truck to pick up or deposit a load along the side of the truck makes it unnecessary to mount the uprights, lifting rams or load carriage for transverse movement of the truck. Accordingly, heavy, expensive construction for mounting the uprights, lifting rams and load carriage for such movement is not necessary, and the uprights may be fixed to one side of the truck to provide maximum counter-balancing effects at all times. The invention further provides a novel arrangement for mounting and extending the load-supporting member relatively to the load carriage, whereby cocking and binding of the load-supporting member is effectively prevented and very little space is required for the mechanisms for extending the load-supporting member.

While one form of the invention has been shown and described, it will be appreciated that this is for the purpose of illustration only and that changes and modifications may be made therein without departing from the spirit and scope of the invention.

I claim:

1. In a side lift truck, a frame, front and rear wheels supported by said frame, said frame providing a space between said front and rear wheels open to one side of said truck, a load carriage mounted for vertical movement in said space, a pair of longitudinally spaced upright assemblies for guiding said load carriage during vertical movement thereof, said pair of upright assemblies being secured to said frame on the side thereof opposite said one side of said truck, a pair of lifting rams for lifting said load carriage, said upright assemblies and said lifting rams being positioned on each side of said load carriage so as to provide no obstruction to said load carriage transversely of the truck whereby said load carriage may be of substantially the width of said truck, said lifting rams being further positioned centrally of said frame transversely of the truck whereby to provide lifting of said load carriage from points centrally of each side thereof, each of said upright assemblies having secondary uprights movable vertically on primary uprights, an arm secured to each secondary upright and engageable by one of said rams whereby said secondary uprights may be elevated by said rams, a load-supporting member, means mounting said load-supporting member on said load carriage for vertical movement with said load carriage and for extending movement relatively to said load carriage beyond said one side of the truck, said means including upper and lower horizontal racks on said carriage at each side thereof, upper and lower pinions on each side of said load-supporting member adjacent the rear thereof engaging said racks whereby to accept the load between said load-supporting member and said load carriage, and means for rotating said pinions to extend said load-supporting member relatively to said load carriage.

2. In a side lift truck, a frame, front and rear wheels supported by said frame, said frame providing a space between said front and rear wheels open to one side of said truck, a load carriage mounted for vertical movement in said space, a pair of longitudinally spaced upright assemblies for guiding said load carriage during vertical movement thereof, said pair of upright assemblies being secured to said frame on the side thereof opposite said one side of said truck, a pair of lifting rams for lifting said load carriage, said upright assemblies and said lifting rams being positioned on each side of said load carriage so as to provide no obstruction to said load carriage transversely of the truck whereby said load carriage may be of substantially the width of said truck, said lifting rams being further positioned centrally of said frame transversely of the truck whereby to provide lifting of said load carriage from points centrally of each side thereof, each of said upright assemblies having secondary uprights movable vertically on primary uprights, an arm secured to each secondary upright and engageable by one of said rams whereby said secondary uprights may be elevated by said rams, a load-supporting member, means mounting said load-supporting member on said load carriage for vertical movement with said load carriage and for extending movement relatively to said load carriage beyond said one side of the truck, and means for extending said load-supporting member relatively to said load carriage beyond said one side of the truck.

3. In a side lift truck, a frame, front and rear wheels supported by said frame, said frame providing a space between said front and rear wheels open to one side of said truck, a load carriage mounted for vertical movement in said space, a pair of longitudinally spaced upright assemblies, means secured to said load carriage and engaging said upright assemblies for guiding said load carriage during vertical movement thereof, said pair of upright assemblies being secured to said frame on the side thereof opposite said one side of said truck, a pair of lifting rams for lifting said load carriage, said upright assemblies and said lifting rams being positioned on each side of said load carriage so as to provide no obstruction to said load carriage transversely of the truck whereby said load carriage may be of substantially the width of said truck, said lifting rams being further positioned centrally of said frame transversely of the truck whereby to provide lifting of said carriage from points centrally of each side thereof, a load supporting member, means mounting said load supporting member on said load carriage for vertical movement with said load carriage and for extending movement relatively to said load carriage beyond said one side of the truck, and means for extending said load supporting member relatively to said load carriage.

References Cited by the Examiner

UNITED STATES PATENTS

| 2,591,544 | 4/52 | Hegarty | 214—674 |
| 2,773,614 | 12/56 | Edwards et al. | 214—730 |
| 2,807,383 | 9/57 | Scheltens | 214—731 |
| 2,829,789 | 4/58 | Pitt | 214—75 |

FOREIGN PATENTS

| 1,078,048 | 3/60 | Germany. |
| 750,793 | 6/56 | Great Britain. |